United States Patent [19]  [11] Patent Number: 4,787,334
Bassine  [45] Date of Patent: Nov. 29, 1988

[54] HOUSE PET LITTER DISPOSAL DEVICE
[76] Inventor: Judith M. Bassine, 4000 Marina Cir., North Fort Myers, Fla. 33903
[21] Appl. No.: 30,126
[22] Filed: Mar. 26, 1987
[51] Int. Cl.⁴ .......................... A01K 29/00
[52] U.S. Cl. .......................... 119/1
[58] Field of Search ............. 119/1, 22, 28
[56] References Cited
U.S. PATENT DOCUMENTS
4,011,837 3/1977 Ksioszk .................... 119/1
4,465,018 8/1984 Mopper ................... 119/1

Primary Examiner—Robert P. Swiatek
Assistant Examiner—Cary E. Stone
Attorney, Agent, or Firm—Alfred E. Wilson

[57] ABSTRACT

A house pet animal waste disposal device is provided. This device will permit the keeping of house pets in the house for extended periods of time, under conditions whereby odors are substantially eliminated. An adjustable absorbent litter supply hopper positioned at one end of an elongated base is provided to supply a measurable layer of litter onto a movable plastic sheath slidably mounted in the elongated base. The elongated base provides an area to which the house pets will be attracted when the need arises to relieve themselves. Periodically or after having been used the plastic sheath with the used litter thereon can be pulled into a receiver unit positioned at the other end of the elongated base. As the plastic sheath is pulled along the elongated base the side edges of the plastic are deflected inwardly to overlie the outer edges of the litter. A crank is provided to wrap the used litter onto itself and it virtually seals itself onto contact and thus seals off and eliminates odors. When the roll of plastic sheathing material is exhausted, or sooner if desired, the used litter in the receiver unit can be removed and discarded, and a new roll of plastic sheathing can be added or joined to the remnant of the last roll used.

1 Claim, 1 Drawing Sheet

U.S. Patent
Nov. 29, 1988
4,787,334
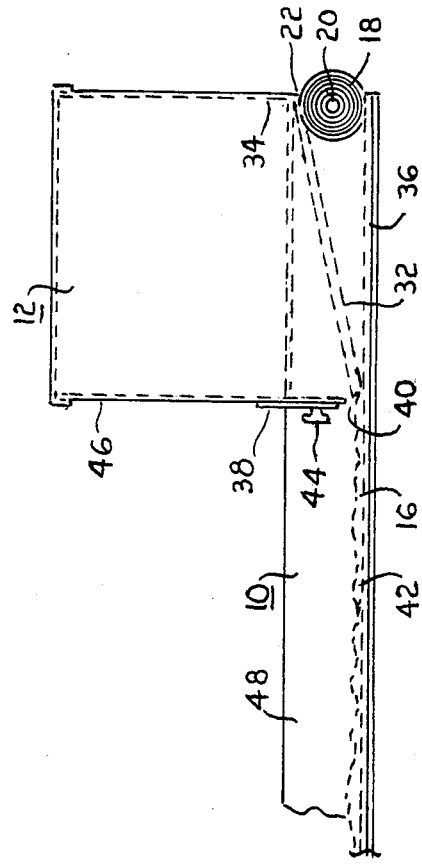
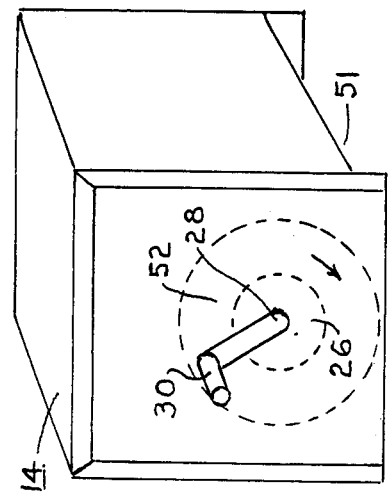
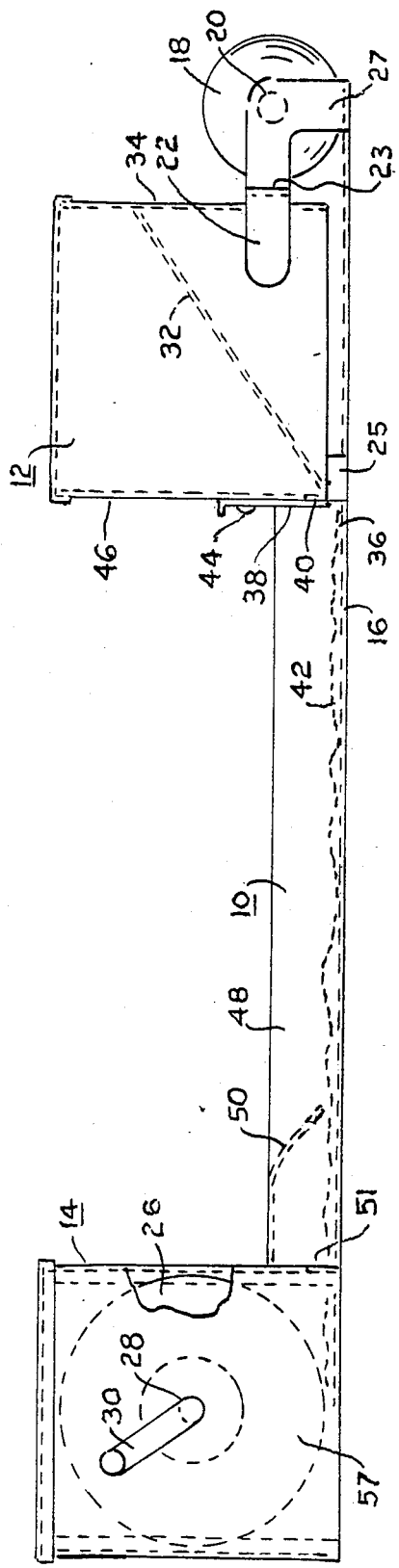

HOUSE PET LITTER DISPOSAL DEVICE

BACKGROUND OF THE INVENTION

Heretofore various types of house pet litter devices have been provided, but the majority of them were of such a size and required so much attention that they were virtually inoperable insofar as providing an easy, relatively automatic operation which could be used over an extended period of time and with which it was not necessary to put the house pets out of doors periodically.

FIELD OF THE INVENTION

The purpose of this litter disposal device is to provide a readily operable house pet care system with which a relatively large supply of absorbent litter material, such for example as a ten pound bag thereof can be placed in a hopper and will be automatically feed onto an elongated plastic strip positioned to receive litter material in measurable quantities from a storage hopper and to distribute it over the plastic sheet in sufficient proportions to enable the house pet to occupy the space on top of the plastic sheet, such for example as a two to three foot long strip, and which after being used can be wrapped into a receiver compartment positiond at the end of the elongated base. The outer edges of the plastic strip are curled over the outer edges of the used absorbent litter to substantially seal the used litter by contacting the back side of the rolled up spent litter in the receiver compartment.

DESCRIPTION OF THE PRIOR ART

Heretofore the pet care devices have been pretty much restricted to the use of relatively large units having adequate space to simultaneously accommodate several pets and which were intended for use by kennels or in installations where a relatively large number of pets would be kept. Insofar as is known no one has thus far devised a pet care device for use in the average home where one or two house pets are involved.

SUMMARY OF THE INVENTION

This development is designed to provide a relatively economical pet care device for the average home where one or two house pets are kept. An elongated plastic strip which has absorbent litter deposited on it as it is pulled under an adjustable gate spreads out the litter for use in a channel shaped trough, and after use the spent litter can be sealingly wrapped in a spent litter receiving compartment until a convenient time is available to dispose of it.

BRIEF DESCRIPTION OF THE DRAWINGS

FIG. 1 is a side elevational view of a portable pet litter disposal device wherein absorbent litter material is deposited on a plastic sheath slidably mounted in a trough interposed between a supply hopper and a disposal receiver.

FIG. 2 is a sectional view of a modified form of the invention.

FIG. 3 is a perspective view of the receiver unit.

DESCRIPTION OF THE PREFERRED EMBODIMENT

Referring to FIG. 1, a pet litter disposal device is illustrated wherein an elongated channel shaped base 10 is interposed between an absorbent litter supply hopper 12 at one end and a receiver 14 at the other end.

The absorbent litter storage supply hopper cabinet 12 is proportioned to receive a reasonable supply of absorbent litter material such for example as a ten (10) pound bag.

A movable plastic sheath 16 slightly wider than the width of the elongated channel shaped base 10 is mounted in roll form 18 on a shaft 20 journalled in the end wall brackets 22 secured to the sides of the hopper cabinet 12 so as to be pulled out from the bottom of the roll 18 beneath the bottom of the cabinet 12 and to be drawn along the channel shaped base 10 and to be wrapped about a reel 26 mounted on a shaft 28 to be actuated by a crank 30. The brackets 22 have outwardly flared steps 23 to accommodate the plastic sheath 16 which is somewhat wider than the width of the channel shaped base 10. The front and rear ends of the cabinet 12 have spaced supports 25 and 27 to elevate the hopper so that the sheath 16 can slide out underneath it.

The supply hopper cabinet 12 preferably has an inclined wall 32 secured at the back wall 34 and terminating a short distance above the bottom 36 of the elongated base 10. The hopper 12 has a movable front plate 38 wich functions as a gate and is adapted to project downwardly into the elongated base 10 as illustrated to adjustably cover the open slot 40 in the cabinet 12 to establish the thickness 42 of a ribbon of absorbent litter on the movable plastic sheath 16 in the elongated channel shaped base 10. A clamp 44 is provided to clamp the movable front plate 38 to the front face 46 of the hopper cabinet 12 to establish the desired thickness of the ribbon of litter 42.

The receiver 14 is mounted at the opposite end of the elongated base 10 to receive the plastic sheath 16 having the spent litter 42 thereon after it has served its duty in the elongated base 10 by having received the animal waste from the house pets thereon. The side walls 48 of the elongated base 10 have inwardly contoured guides 50 to curl the outer edges of the plastic sheath 16 to fold the outer edges of the sheath over the spent litter on the sheath 16.

The crank 30 is rotated in the clockwise direction as viewed in FIG. 1 to pick up the plastic sheath from the underneath side and roll it into the cabinet 14 through the slot 51 to the reel 26 as shown at the left hand end of FIG. 1. The folded over outer edges of the sheath 16 contact the bottom surface of the preceding convolution of the plastic sheath having the spent absorbent litter thereon to substantially seal the spent litter in the sheath 16.

The operation of the invention is as follows: The base 10 and the supply hopper 12 and the receiver 14 are positioned at some convenient location in the home and are set up as illustrated in FIG. 1.

The movable plate 38 which functions as a gate is adjusted to dispense a desired thickness of absorbent litter on the plastic sheath 16. The sheath 16 is positioned as shown in FIG. 1, and the plastic sheath is pulled out to extend the full length of the elongted base 10 and to connect to the reel 26 of the receiver 14.

The sheath 16 is pulled out from the roll 18 and receives the desired thickness of the absorbent litter on it as it is pulled out in the elongated base 10. The sheath 16 is connected up on the reel 26, and the crank 30 is rotated to pull out the sheath 16 from the roll 18 and dispense the desired depth 42 of the litter on the sheath 16. When the elongated base 16 has the desired depth of absorbent litter on it the full length of the elongated base 10 the device is ready for use.

When the house pets desire to utilize the device they proceed to get into the elongated channel shaped base 10. When the device is first set up it may be desirable to dispense a fairly thick layer 42 of litter to enable cats for example to exercise their inborn desire to dig in the litter. After the pets become accustomed to the use of the device the thickness 42 of the litter can be reduced somewhat.

After the device has been used to a desired degree, or after each use if desired, the crank 30 of the receiver 14 can be actuated to withdraw more plastic sheathing 16 from the roll 18 in the supply hopper 12 and to dispense the desired elevation of litter in the channel shaped base.

As the crank 30 of the receiver 14 is actuated the outer edges of the plastic sheath are deflected inwardly by the guides 50 to seal the rolled up spent litter on the back of the convolution preceding it to substantially seal the spent litter until it is desired to remove it. It is not necessary to wait for the entire roll 18 in the hopper 12 to be used before discarding the used portions because the spent litter can be removed at anytime from the receiver 14, it only being necessary to connect up the plastic sheathing 16 having fresh absorbent litter on it and to connect it to the reel 26.

Attention is directed to the fact that the cabinets forming the litter storage supply hopper 12 and the used litter receiver 14 have the same dimensions, and that the open slot 40 in the hopper 12 is of the same dimension as the slot 51 in the receiver cabinet 14. This facilitates the manufacturing of the components of the assembly.

I claim:

1. A householder's litter disposal device for house pets so that the pets do not have to be let outside at such frequent intervals comprising an uncovered channel shaped base that is approximately two feet wide and three feet long having spaced apart upstanding side walls, an absorbent litter dispensing cabinet at one end of the base, and a used litter receiving cabinet at the other end of the base, a reel of plastic sheathing at the litter dispensing end of the base to dispense plastic sheathing through the litter dispensing cabinet to the base, a rotatable reel in the used litter receiving cabinet to withdraw plastic sheathing through the base from the litter dispensing cabinet, means operable on movement of the plastic sheathing out of the litter dispensing cabinet to deposit a layer of absorbent litter on the plastic sheathing, means to vary the thickness of the layer of absorbent litter, a crank in the used litter receiving cabinet to propel the rotatable reel in the used litter receiving cabinet to withdraw the plastic sheathing and the litter positioned thereon from the litter dispensing cabinet and to wind it on the reel in the used litter receiving cabinet, means to deflect the lateral sides of the plastic sheath to overlie the outer edges of the used litter positioned on the plastic sheath as the plastic sheath approaches the used litter receiving cabinet to substantially seal the used litter in the plastic sheath to reduce odors eminating from the used litter.

* * * * *